(No Model.)
W. N. MURDOCK & J. C. HOLLINGS.
VEHICLE TIRE.
No. 605,117. Patented June 7, 1898.
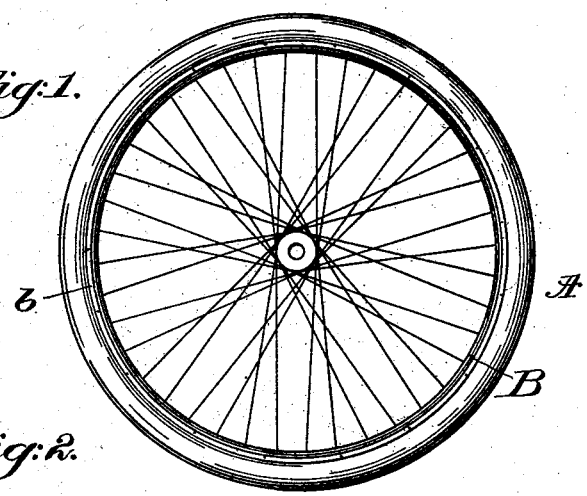
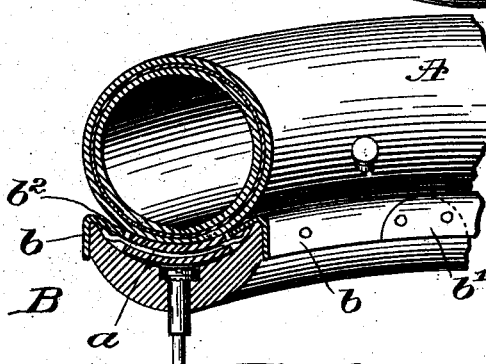
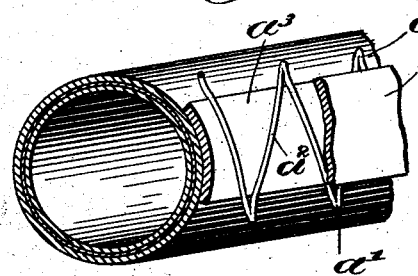
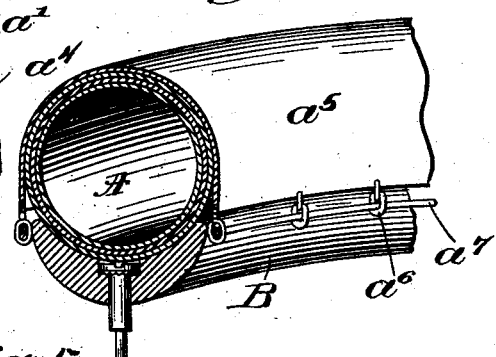
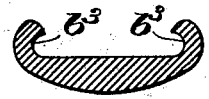
Witnesses.
Thomas J. Drummond
A. C. Harmon
Inventors.
William N. Murdock.
John C. Hollings.
by Crosby & Gregory
Attys.

UNITED STATES PATENT OFFICE.

WILLIAM N. MURDOCK, OF BOSTON, AND JOHN C. HOLLINGS, OF CAMBRIDGE, MASSACHUSETTS; SAID MURDOCK ASSIGNOR TO SAID HOLLINGS.

VEHICLE-TIRE.

SPECIFICATION forming part of Letters Patent No. 605,117, dated June 7, 1898.

Application filed August 28, 1897. Serial No. 649,884. (No model.)

*To all whom it may concern:*

Be it known that we, WILLIAM N. MURDOCK, of Boston, county of Suffolk, and JOHN C. HOLLINGS, of Cambridge, county of Middlesex, State of Massachusetts, have invented an Improvement in Vehicle-Tires, of which the following description, in connection with the accompanying drawings, is a specification, like letters on the drawings representing like parts.

Our invention is an improvement in epicycular tires, the object of our invention being to provide a good commercial tire adapted to the usual vehicle-wheel rim, yet doing away with the very considerable frictional resistance that exists at present in the ordinary pneumatic or other resilient tire.

We have discovered by experiment that the actual plane of relative movement upon which the wheel runs is neither the ordinarily-supposed one where the tire rests upon the road-bed nor in the case of a wheel provided with a tire within which the felly may turn is it the plane or line of surface between the tire and the felly, but is in a line within the tire itself, which has in consequence a longer periphery than the felly.

The vertical yielding to slight inequalities in the road of a "resilient" tire, as that term is commonly understood, has nothing whatever to do with the pulling or propelling features of the tire.

Our experiments have demonstrated that when a wheel provided with a tire free to move on its rim or felly is pushed along over a road under a usual load the tire revolves upon the felly proportionally always to the amount of cushioning—say two inches for every ten feet of horizontal travel—so that it will be evident that in the case of the usual pneumatic wheel where the tire is longitudinally immovable on the felly the radial resiliency or piling-up movement of the rubber which occasions this creeping or relative travel of the tire on the felly causes just so much hindrance to the forward movement of the wheel, inasmuch as every time the rubber is pushed or piled up by its yielding under the weight of the rider it offers the same amount of counter-resistance to the movement of the wheel.

We have alluded to pushing a wheel forward. The result is the same whether moving it on a horizontal surface or uphill or downhill, and, in fact, we have found it to be the same even in strongly back-pedaling when riding downhill on a bicycle provided with our tire.

Our invention comprises means for holding an ordinary pneumatic tire on a usual bicycle or other wheel rim.

Other features of our invention and the various details thereof will be more fully pointed out in the following description and particularly defined in the appended claims, reference being had to the accompanying drawings, illustrative of a preferred embodiment of our invention.

In the drawings, Figure 1 is a side elevation of a usual bicycle-wheel provided with our improved tire. Fig. 2 is a perspective detail showing the end in cross-section of a fragment of the wheel felly and tire. Fig. 3 is a similar view, parts being broken away to show the securing means and holding-rib. Fig. 4 is a similar view showing a modification. Fig. 5 is a transverse section of a modified form of wheel-rim.

A designates any usual or preferred kind of pneumatic or other resilient tire, the various features of our invention being, however, particularly intended for and adapted to a pneumatic tire.

On the under or inner circumferential side of the tire we provide a holding-rib $a$, within which are mounted or embedded securing prongs or flanges $a'$, preferably in separated order and staggered relation, as herein shown, these flanges $a'$ being herein shown as formed by introducing a piece of wire $a^2$, bent sharply in zigzag fashion and placed between two strips $a^3$ $a^4$ of rubber, said strips being held firmly together and against the tire and then all vulcanized solidly and integrally together. This means of constructing and securing the parts has been found practically advantageous, although we do not wish to limit ourselves thereto, inasmuch as any means for providing the flanges $a'$, adjacent the edges of a holding-rib, may be provided and would be within the scope of our invention. The tire as thus arranged is mounted directly upon a wheel-felly B, said felly in Fig. 2 being shown as an ordinary concaved felly or wheel-rim, along the edges of which plates $b$ are secured, being shown as overlapped at $b'$, said plates having their edges $b^2$ turned inwardly to overhang the rim and provide annular ways to receive the flanges $a'$, so that the latter may travel loosely longitudinally therein as the tire A moves along relatively to the felly B in its creeping action, as already described, and yet securely hold the tire on the wheel against the rolling action thereof in turning corners, &c., which would tend to twist the tire out of engagement with the felly.

In Fig. 5 we have shown the ways for the flanges $a'$ as formed by grooving out the felly itself at $b^3$ instead of securing the plates $b$ thereto, or said felly may be rolled out of sheet metal.

In Fig. 4 it will be observed that we have also directly mounted the tire upon a felly B, but have not used the holding-rib and flanges to secure it, having placed the tire A on the felly in the position it usually occupies when it is cemented thereto, and over the tire we have placed a covering-jacket $a^5$, provided with loops $a^6$ along its edges at each side of the tire and felly and have stretched annular hoops or wires $a^7$ through these loops around the wheel, thereby securely retaining the tire against removal from the felly, while at the same time permitting free travel thereof longitudinally around the wheel.

In operation the tire, as is well understood, yields to the pressure of its load, becoming horizontally oblate or flattened, there being, however, an entire absence in our novel tire of all the usual and serious resistance due to the inability of the tire to move on the felly, the tire on the contrary moving freely along as the creeping motion thereof gives it tendency to move, and because of the flattening of the tire it bears against and mainly upon the outer surfaces of the portions $b^2$, Fig. 2, or of the edges of the felly in Figs. 4 and 5, and slips along these with exceedingly little retardation, the retaining devices $a'$ or $a^5$ $a^7$ securely holding the tire in place and at the same time offering no obstacle to its free longitudinal movement relatively to the felly.

Various changes and modifications may be resorted to without departing from the spirit and scope of our invention.

Having fully described our invention, what we claim, and desire to secure by Letters Patent, is—

1. The combination with a vehicle-wheel, of a yielding, compressible tire mounted directly flat upon and coextensive with the width of the felly of the wheel in immediate contact with the felly, and free to move longitudinally thereon, and provided at the edges of the felly with retaining devices to prevent the tire from being moved transversely to the felly, without interfering with said longitudinal movement, substantially as described.

2. The combination with a vehicle-wheel, of a yielding, compressible tire mounted thereon and free to move longitudinally of the felly, said tire being provided at its inner annular side with retaining-flanges permanently secured thereto, and said felly being provided with overhanging portions at its edges lapped over toward each other and on top of said flanges to form ways for said flanges to travel within substantially as described.

3. The combination with a wheel, of a yielding, compressible tire mounted thereon to move freely along its felly, said tire having a holding-rib permanently secured to its inner side, said holding-rib being provided with lateral flanges throughout its length, and overhanging portions bent in toward each other in a plane approximately parallel to the bearing-surface of the felly to embrace and retain said flanges, substantially as described.

4. A tire having a holding-rib permanently formed on its inner side, said rib having fixedly embedded therein a wire bent sharply zigzag, the angular portions thereof projecting out laterally from the edges of the said rib and overhanging the adjacent portions of the tire proper, substantially as described.

5. The combination with a vehicle-wheel, of a tire mounted immediately upon and against the felly or rigid rim of the wheel, said tire being freely yielding and resilient throughout its entire cross-section from its tread to and including the portion in contact with the felly, and free to move longitudinally on the felly, and retaining means preventing lateral movement but not interfering with the said free resiliency and yielding of the entire tire nor with said longitudinal movement, substantially as described.

In testimony whereof we have signed our names to this specification in the presence of two subscribing witnesses.

WILLIAM N. MURDOCK.
JOHN C. HOLLINGS.

Witnesses:
GEO. H. MAXWELL,
AUGUSTA E. DEAN.